Oct. 5, 1954  A. CAMERON  2,690,936
SELF-ALIGNING BEARING
Filed July 26, 1951
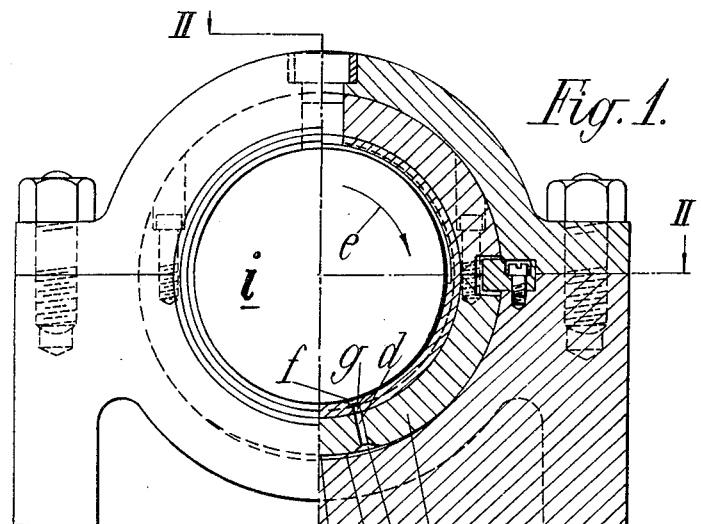
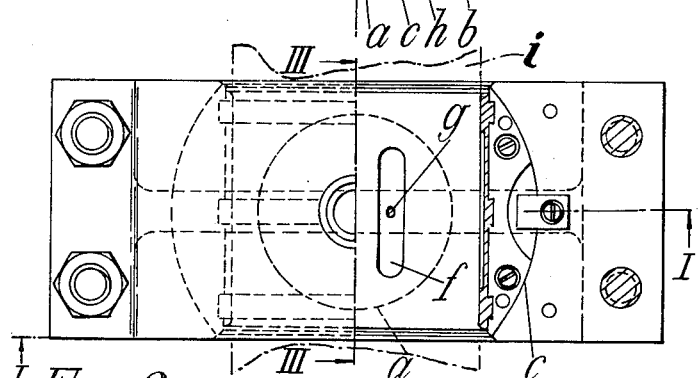
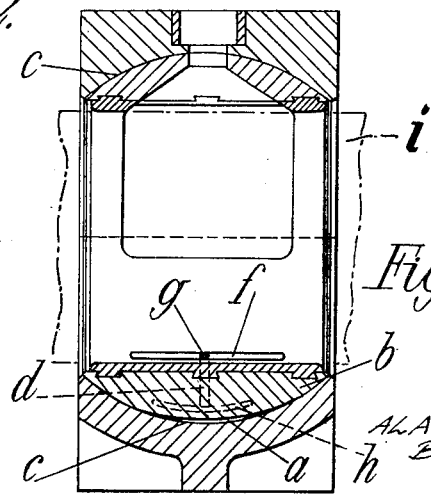
INVENTOR.
ALASTAIR CAMERON
BY
ATTORNEYS.

Patented Oct. 5, 1954

2,690,936

UNITED STATES PATENT OFFICE 2,690,936

SELF-ALIGNING BEARING

Alastair Cameron, Wallsend-on-Tyne, England, assignor to The Parsons and Marine Engineering Turbine Research and Development Association, Wallsend-on-Tyne, England Application January 26, 1951, Serial No. 207,895

4 Claims. (Cl. 308—122)

This invention relates to self-aligning bearings of the kind wherein a shaft is carried in the bearing surface of a bearing member or knuckle pad which is tiltably mounted in a bearing shell.

In such bearings, when the shaft bends or tilts, the knuckle pad moves so as to maintain the shaft parallel to the bearing shaft surface of the knuckle pad. Such movement is initiated when the line of reaction moves from the centre line to some other point nearer to the edge of the bearing nearest the more highly loaded part of the shaft when the load is greater on one side of the bearing than on the other side.

Considering the statics of the system, and assuming the radius of the knuckle pad for a "square" bearing is equal to $\sqrt{2}\times$the radius of the shaft, there will be a tangential frictional force on the knuckle pad equal to $\mu W$ acting at a distance of $\sqrt{2}R$ from the centre of the shaft where the bearing load is W. The turning force is usually supposed to act at a distance of $R/3$ from the centre of the bearing and hence the bearing will move if $$\sqrt{2}\mu RW < \frac{RW}{3}$$

i. e. if $\mu < 0.236$. If this is not so then the knuckle pad will not move. Theoretical investigation of the inclined shaft shows that the point of support actually does not move as much as $\frac{1}{3}$ and this will reduce the critical value of $\mu$.

The object of the present invention is to provide forms of self-aligning bearings wherein the movements of the knuckle pad are substantially facilitated.

The present invention consists in a self-aligning bearing having features as set forth in the claims appended hereto.

Referring to the accompanying diagrammatic drawings:

Figure 1 is a sectional elevational on the line I—I of Figure 2 of one convenient construction of bearing embodying the present invention.

Figure 2 is a sectional plan view on the line II—II of Figure 1, and

Figure 3 is a vertical sectional view on the line III—III of Figure 2.

In carrying the invention into effect according to one convenient form illustrated by way of example in Figures 1–3 as applied to a "square" bearing, a depression $a$ is provided on the periphery of the knuckle pad $b$ extending over about $\frac{1}{5}$ of the periphery thereof so that there is a space beneath the shaft $i$ between the spherical housing surface $c$ in which the knuckle pad $b$ is nested. A conduit $d$ is formed in the knuckle pad radially disposed at an angle of about 15° ahead of the direction of rotation $e$ of the shaft $i$, this conduit communicating by way of a hole $g$ with the aforesaid space and with an elongated depression $h$ in the bearing surface of the knuckle pad. The cavity surface $f$ bleeds off some of the high pressure oil generated by the fluid film and feeds it into the cavity $h$ and space formed by the depression $a$ so that the load or a substantial part of the load is carried by an oil layer and the knuckle pad $b$ can turn easily.

The operative area of the knuckle pad embodying the present invention is preferably $\frac{1}{3}$ to $\frac{1}{2}$ of the projected area of the bearing in cases where the connecting duct is positioned as described above.

The invention is particularly, though not exclusively, applicable for the bearings of pinion shafts in marine reduction gears.

I claim:

1. A self-aligning bearing of the kind embodying a shaft carried in the bearing surface of a knuckle pad which is tiltably mounted in a bearing shell characterised by the feature that the cooperating bearing surfaces are relieved to form a cavity in the vicinity of the loaded portion of the periphery of the knuckle pad, the said cavity being completely surrounded by surfaces of the cooperating members which are in bearing engagement and the knuckle pad is furnished with a duct that provides the sole communication from said cavity to the clearance space separating the loaded surface of said shaft and the loaded portion of said knuckle pad bearing surface, the said duct running from the said cavity to a point where the bearing pressure between shaft and knuckle pad bearing surface is comparatively high whereby high-pressure lubricant generated by fluid lubrication between said shaft and said knuckle pad bearing surface is fed into said cavity.

2. A self-aligning bearing as claimed in claim 1 wherein the knuckle pad is furnished with a spherical surface embodying a depression constituting said cavity.

3. A self-aligning bearing as claimed in claim 1, wherein the knuckle pad is furnished with a spherical surface engaging a spherical seating on said bearing shell.

4. A self-aligning bearing as claimed in claim 1, wherein said duct is connected to the shaft bearing surface at a point about 15° ahead of the load line of the shaft.

References Cited in the file of this patent

UNITED STATES PATENTS

| Number | Name | Date |
|---|---|---|
| 2,464,492 | Dimick | Mar. 15, 1949 |
| 2,498,011 | Sherbondy | Feb. 21, 1950 |

FOREIGN PATENTS

| Number | Country | Date |
|---|---|---|
| 12,509 | Great Britain | 1889 |
| 397,152 | Germany | June 14, 1924 |